United States Patent [19]

Schorr

[11] Patent Number: 5,020,102

[45] Date of Patent: May 28, 1991

[54] SEMI-FLOATING AC/DC ACTIVE TERMINATION CIRCUIT WITH CURRENT SINK

[75] Inventor: Ian A. Schorr, Chicago, Ill.

[73] Assignee: Rockwell International Corporation, El Segundo, Calif.

[21] Appl. No.: 387,732

[22] Filed: Aug. 1, 1989

[51] Int. Cl.$^5$ .............................................. H04M 9/08
[52] U.S. Cl. .................................... 379/399; 379/398; 379/345
[58] Field of Search ............... 379/398, 399, 345, 405, 379/414, 413, 416; 333/22 R

[56] References Cited

U.S. PATENT DOCUMENTS

| | | | |
|---|---|---|---|
| 4,037,064 | 7/1977 | Nahay | 379/405 |
| 4,283,604 | 8/1981 | Chambers, Jr. | 379/405 X |
| 4,357,494 | 11/1982 | Chambers, Jr. | 379/398 X |
| 4,612,417 | 9/1986 | Toumani | 379/413 |
| 4,862,495 | 8/1989 | Stibila | 379/399 X |

Primary Examiner—James L. Dwyer
Assistant Examiner—M. Shehata
Attorney, Agent, or Firm—C. B. Patti; V. L. Sewell; H. F. Hamann

[57] ABSTRACT

A semi-floating AC/DC active termination circuit with current sink. A voice frequency transmission line termination circuit has at least tip and ring terminals and provides an AC termination impedance and a DC termination resistance. The circuit has at least a first resistance element connected between the tip and ring terminate which forms the DC termination resistance. A first resistor/capacitor series circuit, having at least a resistor and capacitor connected in series, is connected between the tip terminals and a first virtual ground terminal, and a second resistor/capacitor series circuit, having at least a resistor and capacitor connected in series, is connected between the ring terminal and a second virtual ground terminal. The first resistance element and the first and second resistor/capacitor series circuits form the AC termination impedance. A first operational amplifier has an output connected to the first virtual ground terminal and a second operational amplifier has an output connected to the second virtual ground terminal. The first and second operational amplifiers provide a virtual ground for voltages and currents appearing at the tip and ring terminals. In a preferred embodiment the first operational amplifier has a negative input operationally connected to a voltage source and has a positive input connected to a signal receiving line. The second operational amplifier has a negative input operationally connected to the signal receiving line and has a positive input connected to a circuit ground.

20 Claims, 2 Drawing Sheets

SEMI-FLOATING AC/DC ACTIVE TERMINATION CIRCUIT WITH CURRENT SINK

BACKGROUND OF THE INVENTION

The present invention relates in general to a termination circuit for use in telephone voice frequency transmission systems. More specifically, the present invention relates to an active DC and AC termination circuit for a subscriber end of a voice frequency telephone transmission line. The circuit of the present invention provides all necessary functions required for this type of termination, such as proper DC loop closure impedance, sufficient longitudinal balance, proper AC termination impedance to meet echo return loss specifications, etc.

Prior art subscriber line interface circuits (SLIC) are well known. The subscriber line interface circuit is a central office interface to a two wire line. The most important function of a SLIC is to feed the current to a subscriber in order to provide power for a subscriber's equipment operation. Other important functions of the SLIC include alerting subscribers equipment by ringing, detecting subscribers equipment going off-hook as a request for service, etc. The circuit of the present invention relates to a SLIC only in that it applies to the subscriber end of the telephone line in general, and to the subscriber being a central office terminal in particular. All functions of the central office terminal are complimentary to the SLIC, that is, while the SLIC feeds the current, the central office terminal terminates or sinks the current. The SLIC and the central office terminal compliment each other, but they are entirely different circuits, having different functions with different architecture and requirements, etc.

In general several important differences exist between subscriber line interface circuits and the semi-floating active termination circuit of the present invention. For example, the semi-floating active termination circuit is a terminating/current sinking circuit rather than a current feeding circuit; DC termination consists entirely of a passive/resistive means, which is not true for a SLIC; AC termination circuits of the present invention contain no feedback to tip and ring line terminals; AC termination is determined by passive components only with active components providing virtual ground; DC termination is truly floating in reference to ground, which is not true for a SLIC; the receive amplifier for the present invention circuit must be AC coupled, while it is DC coupled for a SLIC; longitudinal balance control in the circuit of the present invention is achieved by providing a very high impedance for longitudinal current which is opposite to a very small impedance used in the SLIC circuit; and DC line current does not flow through any active device of the circuit of the present invention, whereas it does flow through active devices in the SLIC.

A typical prior art subscriber termination circuit is shown in FIG. 1 of the drawings and will be discussed in more detail below. The prior art subscriber termination circuit has a transformer which provides an AC termination by transferring proper impedance from a secondary winding to the primary winding connected across the tip and ring terminals at the voice frequency transmission line. A DC path is provided by an electronic inductor in series with a loop closure relay. An AC and DC path is blocked by an inductor L1 and a capacitor C1, respectively. The major drawback with this prior art circuit is the high cost of materials involved, the large PC board space required and the extensive manual labor necessary for assembly of the circuit. The present invention overcomes these drawbacks of the prior art.

SUMMARY OF THE INVENTION

It is an object of the present invention to provide a termination circuit which eliminates a transformer used in prior art circuits thereby providing a circuit which has the advantage of low cost of materials used, small area of the components and economical manufacturing costs.

It is a further object of the present invention to provide a circuit which terminates a two wire voice frequency line in a central office terminal of a digital loop carrier.

The present invention is a transmission line termination circuit having at least tip and ring terminals and providing an AC termination impedance and a DC termination resistance. The circuit has at least a first resistance element connected between the tip and ring terminals which forms the DC termination resistance. A first resistor/capacitor series circuit, having at least a resistor and capacitor connected in series, is connected between the tip terminal and a first virtual ground terminal. Similarly, a second resistor/capacitor series circuit, having at least a resistor and capacitor connecting in series, is connected between the ring terminal and a second virtual ground terminal. The first resistance element and the first and second resistor/capacitor series circuits form the AC termination impedance. A first operational amplifier has an output connected to the first virtual ground terminal and a second operational amplifier has an output connected to the second virtual ground terminal. The first and second operational amplifiers provide virtual grounds for voltages and currents appearing at the tip and ring terminals.

The first operational amplifier in a preferred embodiment has a negative input connected to a voltage source and has a positive input connected to a signal receiving line. The second operational amplifier has a negative input operationally connected to the signal receiving line and has a positive input connected to a circuit ground.

In the circuit of the present invention the resistance element is floating with respect to the virtual ground which is provided by the circuit. The resistance element which is the DC termination resistance can be larger than an equivalent AC termination resistance of the AC termination impedance. Furthermore, the DC termination resistance can be substantially smaller than a resistance portion of an equivalent impedance of the resistor in series with the capacitor in either of the first and second resistor/capacitor series circuits. Also in each of the first and second resistor/capacitor series circuits the circuits may have the same impedance. The resistance element in the DC termination resistance forms a substantial part of the resistance portion of the A termination impedance.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunc

DESCRIPTION OF THE PREFERRED EMBODIMENT

The present invention has general applicability but is most advantageously utilized for terminating a two wire voice frequency line at a central office terminal of a digital loop carrier system. For a central office terminal termination network the following specifications must be met in order for the network to be compatible with existing signaling and transmission circuits at the central office serving a digital loop carrier system:

| | |
|---|---|
| On-Hook DC Resistance | 20 kOhms > = R > = 40 Kohms |
| Off-Hook DC Resistance | < = 1150 kOhms |
| Off-Hook Echo Return Loss | > = 18 dB |
| Off-Hook Singing Return Loss | > = 10 dB |
| Longitudinal Balance 200 Hz–3,000 Hz | > = 58 dB |
| Max. Output Signal in the Receive direction | > = 3 dBm |
| Frequency Response of the Receive Channel 400 Hz–2800 Hz | +0.5/−1 dB |
| Max. Common Mode Longitudinal Voltage | 50 Vrms |

Figure 1:
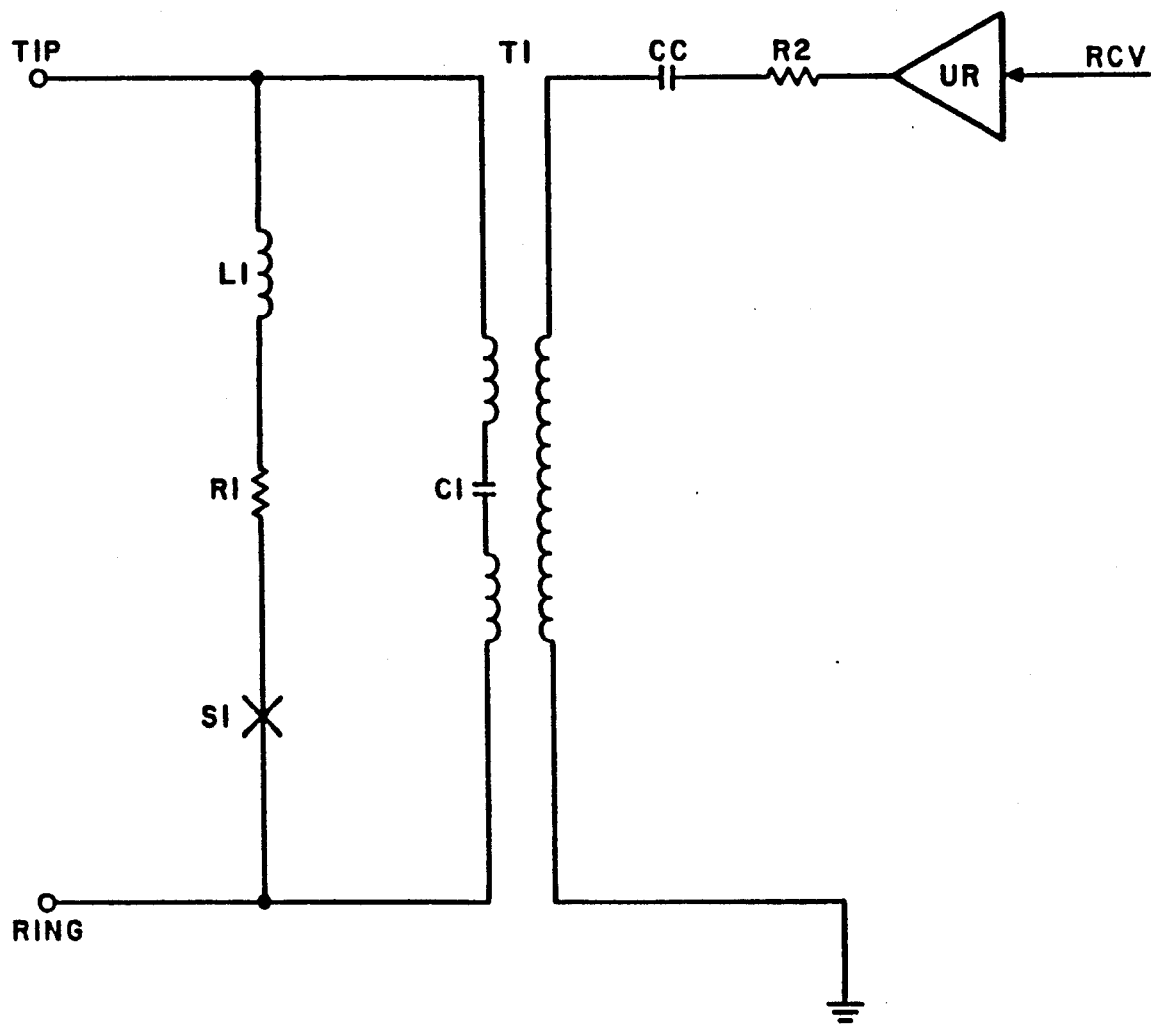
- FIG. 1 is a circuit diagram of a prior art subscriber line termination circuit.

A typical prior art circuit for a digital loop carrier, central office terminal two wire termination is depicted in the circuit of FIG. 1. The circuit has a transformer T1 with a midpoint capacitor C1 which provides an AC termination and DC blocking while the relay S1 in series with the resistor R1 and an inductor L1 provides a loop closure, a DC termination and an AC blocking. Although other variations of the FIG. 2 circuit are known in the prior art, all of these circuits are based on the principle of separating the AC and DC paths. The separation of AC and DC paths allows independent choice of the AC termination impedance and the DC loop closure resistance. For most applications the ideal AC impedance consists of a 900 Ohm resistance connected in series with a 2.16 micro-Fd capacitance, while an ideal DC termination resistance varies with the application. For the digital loop carrier, central office terminal application and ideal DC termination resistance is between 900 Ohms and 1150 Ohms. In addition to providing an AC and DC termination impedance, the circuit of FIG. 2 provides good longitudinal balance due to transformer isolation of a grounded power supply from the tip and ring terminals.

Figure 2:
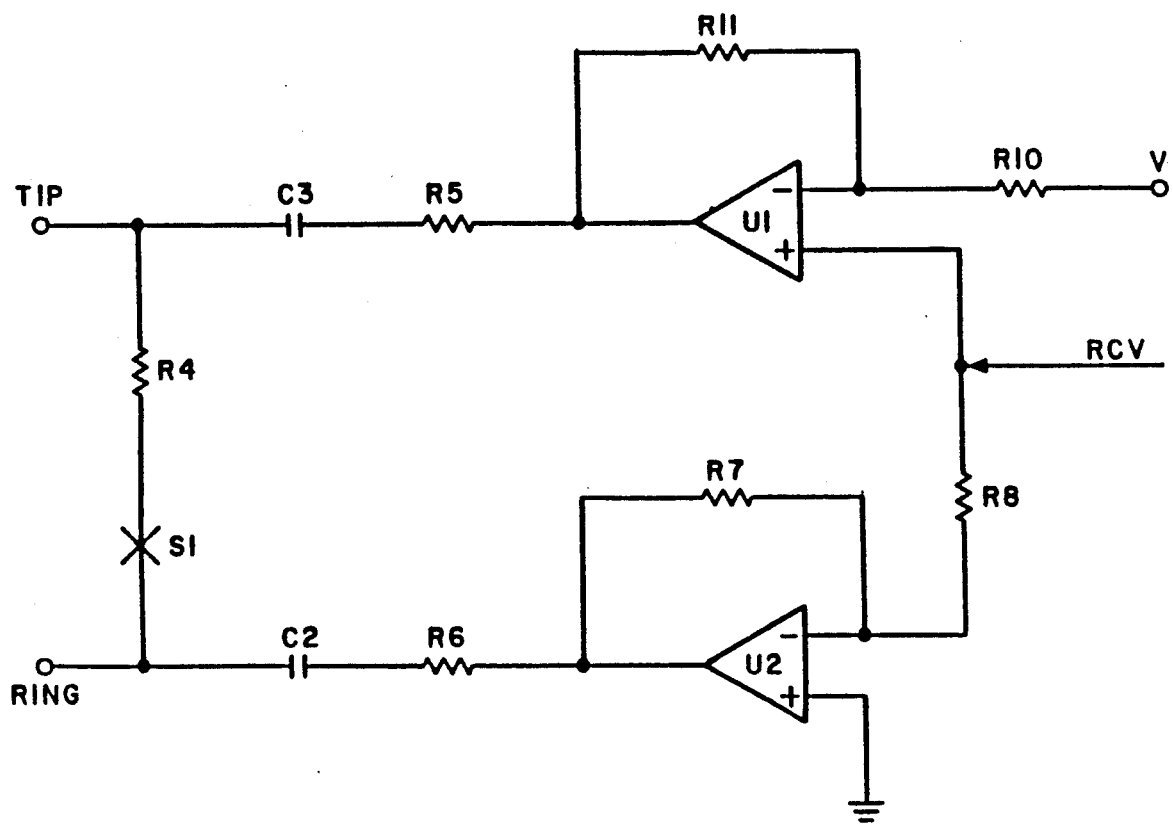
FIG. 2 is a circuit diagram of a semi-floating active termination circuit according to the present invention.

The architecture of the FIG. 2 circuit and other variations thereof provides the desired features of a subscriber and two wire termination. However, it also has many drawbacks, such as use of a high cost, bulky transformer and midpoint capacitor, use of an inductor, complex and expensive circuitry that cannot be integrated, a high part count, a need for a large PC board area and a high cost of manufacturing. The circuit of the present invention, as shown for example in FIG. 2, overcomes these drawbacks in the prior art and provides a superior line termination circuit for use in terminating a two wire voice frequency line at a central office terminal in a digital loop carrier system.

Figure 3:
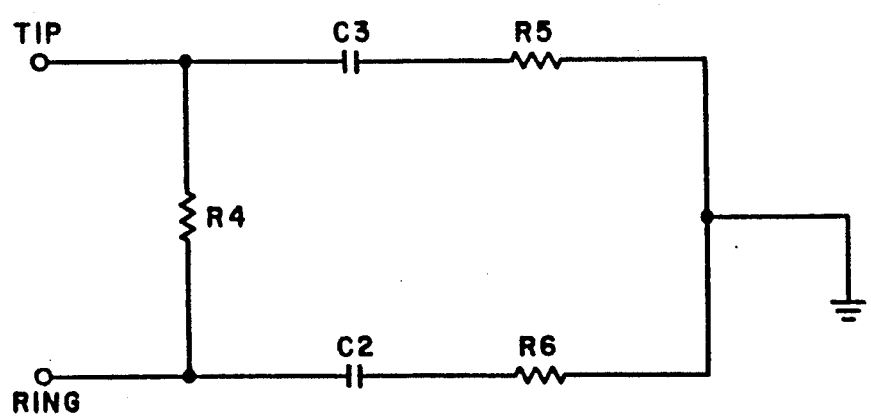
FIG. 3 is a circuit diagram of a simplified equivalent circuit of the FIG. 2 circuit.

The circuit depicted in FIG. 3 is a simplified equivalent circuit of the FIG. 2 circuit. The equivalent AC termination shown in FIG. 3 is created by a resistor R4 connected in parallel with a series connection of capacitor C3 and resistor R5, as well as resistor R6 and capacitor C2. The connection of resistors R5 and R6 are connected (see FIG. 2) to the outputs of operational amplifiers U1 and U2, respectively, which present a virtual ground for any voltage and current appearing at the tip and ring terminals. Consequently one end of resistors R5 and R6 is connected to ground. When resistor R5 is equal to resistor R6 and capacitor C3 equal to capacitor C2, the termination impedance can be expressed by the following equation:

$$Z = \frac{R4(RR4 + R^2 + 1/W^2C^2 - jR4/WC)}{(R4 + R)^2 + 1/W^2C^2}$$

WHERE:
R=R6+R5
C=C3/2=C2/2
j=√−1

If a DC termination can be larger than a real part of an AC termination (as is the case in a central office terminal in a digital loop carrier system) a combination of values can be found which makes the value of the termination reasonably close to 900 Ohms in series with a 2.16 micro-Fd capacitance. It can be seen from the equivalent circuit of FIG. 3 that the only path to ground from the tip and ring terminals is the resistor/capacitor series circuit of resistor R5 in series with capacitor C3 and the resistor/capacitor series circuit of resistor R6 in series with capacitor C2. If the impedance of both of the above combinations is made substantially equal and substantially larger than the resistance of the floating resistor R4, the circuit will yield a very good longitudinal balance, even if R6 is not exactly equal to R5 and even if C3 is not exactly equal to C2. In fact, if R5 and R6 are much larger in value than resistor R4, the circuit is floating with respect to ground and the longitudinal balance becomes almost infinite. Such configuration would cause very large attenuation of a received signal and consequently real values used are a compromise between longitudinal balance and attenuation and the termination is semi-floating rather than fully floating. With regards to the FIG. 2 circuit a detailed analysis shows that the voice frequency longitudinal balance can be approximated by the following equation:

$$LB = 20 \log \left\{ \left[ \frac{\left[ \frac{R_t}{R_s} + \frac{R_t}{R_t + R_s + R_s R_t/R_5} \right]}{\frac{1}{R_s} + \frac{1}{R_t} + \frac{1}{R_6} - \frac{1}{R_t^2/R_s + R_t + R_t^2/R}} + \frac{1}{R_s} \right] \middle/ \frac{1}{R_s} + \frac{1}{R_t} + \frac{1}{R_5} \right. $$

$$\left. - \frac{\frac{1}{R_s} + \frac{1}{R_t + R_s + R_s R_t/R_5}}{\frac{1}{R_s} + \frac{1}{R_t} + \frac{1}{R_6} - \frac{1}{R_t^2/R_s + R_t + R_t^2/R}} \right\}$$

Where
 RS = 368 Ohms
 Rt = R4 = DC termination resistance equal 1022 Ohms in the preferred embodiment of FIG. 1.

For a 1% imbalance between resistors R6 and R10 in the FIG. 2 circuit the longitudinal balance is equal to −65 dB. This result is obtained due to a semi-floating characteristic of the AC termination. In fact, if the AC and DC paths were separated and an AC termination were created by a grounded resistor R6 and grounded resistor R5, the respective result would drop to −52 dB.

In addition to AC and DC termination, the circuit of the present invention must provide for voice frequency transmission in a receive direction. As shown in FIG. 2, this can be provided by operational amplifiers U1 and U2 which receive a signal on line RCV. The output signal for the receive direction is attenuated. In order to provide a sufficient output signal, high voltage complimentary operational amplifiers are utilized. With the −52.5 volt office battery used as a power supply, the output swing between the outputs of operational amplifiers U1 and U2 is approximately 100 volts peak to peak.

More specifically in regards to the FIG. 2 circuit resistor R4 is connected in series with switch S1 between the tip terminal and the ring terminal. The tip terminal is connected to the output of operational amplifier U1 by the resistor/capacitor series circuit of capacitor C3 connected in series with resistor R5. Similarly, the ring terminal is connected to the output of operational amplifier U2 by the resistor/capacitor series circuit of capacitor C2 connected in series with resistor R6. The operational amplifier U1 has a negative input connected via resistor R10 to a voltage source and has a positive input connected to the signal receiving line RCV. The second operational amplifier U2 has a negative input connected via resistor R8 to the signal receiving line RCV and has a positive input which is connected to a circuit ground. Resistors R11 and R7 provide appropriate feedback for the operational amplifiers U1 and U2, respectively.

It is further noted that in prior art circuits such as depicted in FIG. 1 the signal receive line RCV is connected to the transformer T1 via the series circuit of amplifier UR, resistor R2 and capacitor CC.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A transmission line termination circuit having at least tip and ring terminals and providing an AC termination impedance and a DC termination resistance comprising:
    at least a first resistance element connected between the tip and ring terminals;
    a first resistor and capacitor series circuit connected between the tip terminal and virtual ground;
    a second resistor and capacitor series circuit connected between the ring terminal and virtual ground;
    a first resistance element being the DC termination resistance and the resistance element floating with respect to the virtual ground.

2. The circuit described in claim 1, wherein the first resistance element and the first and second resistor and capacitor series circuits form the AC termination impedance.

3. The circuit described in claim 2, wherein the first resistance element is the DC termination resistance and wherein the DC termination resistance is larger than an AC termination resistance of the AC termination impedance.

4. The circuit described in claim 1, wherein each of the first and second resistor and capacitor series circuits has substantially the same impedance.

5. The circuit described in claim 1, wherein the first resistance element is the DC termination resistance and wherein the DC termination resistance is substantially smaller than a resistance portion of an equivalent impedance of the resistor in series with the capacitor in either of said first and second resistor and capacitor series circuits.

6. The circuit described in claim 2, wherein the first resistance element is the DC termination resistance and forms a substantial part of the resistance portion of the AC termination impedance.

7. A transmission line termination circuit having at least tip and ring terminals and providing an AC termination impedance and a DC termination resistance comprising:
    at least a first resistance element connected between the tip and ring terminals;
    a first resistor and capacitor series circuit connected between the tip terminal and virtual ground; and a second resistor and capacitor series circuit connected between the ring terminal and virtual ground;

the first resistance element being the DC termination resistance, and the first resistance element and the first and second resistor and capacitor series circuits forming the AC termination impedance.

8. The circuit described in claim 7, wherein the resistance element is floating with respect to the virtual ground.

9. The circuit described in claim 7, wherein the first resistance element is the DC termination resistance and wherein the DC termination resistance is larger than an AC termination resistance of the AC termination impedance.

10. The circuit described in claim 7 wherein each of the first and second resistor and capacitor series circuits comprises a resistor in series with a capacitor.

11. The circuit described in claim 10 wherein each of the first and second resistor and capacitor series circuits has substantially the same impedance.

12. The circuit described in claim 10, wherein the DC termination resistance is substantially smaller than a resistance portion of an equivalent impedance of the resistor in series with the capacitor in either of said first and second resistor and capacitor series circuits.

13. The circuit described in claim 7, wherein the first resistance element forms a substantial part of the resistance portion of the AC termination impedance 14. A transmission line termination circuit having at least tip and ring terminals and providing an AC termination impedance and a DC termination resistance comprising:

at least a first resistance element connected between the tip and ring terminals which forms the DC termination resistance;

a first resistor and capacitor series circuit, having at least a resistor and capacitor connected in series, connected between the tip terminal and a first virtual ground terminal;

a second resistor and capacitor series circuit, having at least a resistor and capacitor connected in series, connected between the ring terminal and a second virtual ground terminal;

the first resistance element and the first and second resistor and capacitor series circuits forming the AC termination impedance;

a first operational amplifier having an output connected to the first virtual ground terminal;

a second operational amplifier having an output connected to the second virtual ground terminal; and the first and second operational amplifiers providing a virtual ground for voltages and currents appearing at the tip and ring terminals.

15. The circuit described in claim 14, wherein the first operational amplifier has a negative input operationally connected to a voltage source and has a positive input connected to a signal receiving line; and wherein the second operational amplifier has a negative input operationally connected to the signal receiving line and has a positive input connected to a circuit ground.

16. The circuit described in claim 14, wherein the resistance element is floating with respect to the virtual ground.

17. The circuit described in claim 14, wherein the DC termination resistance is larger than an equivalent AC termination resistance of the AC termination impedance.

18. The circuit described in claim 14, wherein each of the first and second resistor and capacitor series circuits has substantially the same impedance.

19. The circuit described in claim 14, wherein the DC termination resistance is substantially smaller than a resistance portion of an equivalent impedance of the resistor in series with the capacitor in either of said first and second resistor and capacitor series circuits.

20. The circuit described in claim 14, wherein the DC termination resistance forms a substantial part of the resistance portion of the AC termination impedance.

* * * * *